United States Patent
Okuno

(10) Patent No.: US 6,810,700 B2
(45) Date of Patent: Nov. 2, 2004

(54) APPARATUS FOR STARTING VEHICLE ENGINE

(75) Inventor: Masanari Okuno, Aichi (JP)

(73) Assignee: Kabushiki Kaisha Tokai Rika Denki Seisakusho (JP)

( * ) Notice: Subject to any disclaimer, the term of this patent is extended or adjusted under 35 U.S.C. 154(b) by 243 days.

(21) Appl. No.: 10/119,819

(22) Filed: Apr. 10, 2002

(65) Prior Publication Data

US 2002/0148262 A1 Oct. 17, 2002

(30) Foreign Application Priority Data

Apr. 11, 2001 (JP) .................................... 2001-112527

(51) Int. Cl.⁷ ............................................. B60R 25/02
(52) U.S. Cl. ...................... 70/186; 70/252; 70/278.7
(58) Field of Search ..................... 70/182–186, 252, 70/278.3, 278.7

(56) References Cited

U.S. PATENT DOCUMENTS

| | | | | |
|---|---|---|---|---|
| 1,259,334 A | * | 3/1918 | Zolnierowicz | 70/185 |
| 1,483,808 A | * | 2/1924 | Hugues | 70/213 |
| 3,859,828 A | * | 1/1975 | Ibuka et al. | 70/252 |
| 4,559,795 A | * | 12/1985 | Zagoroff | 70/422 |
| 4,716,748 A | * | 1/1988 | Watanuki et al. | 70/252 |
| 4,827,744 A | * | 5/1989 | Namazue et al. | 70/252 |
| 4,982,584 A | * | 1/1991 | Takeda et al. | 70/252 |
| 5,096,033 A | * | 3/1992 | Osborn | 477/96 |
| 5,117,664 A | * | 6/1992 | Kurozu et al. | 70/252 |
| 6,260,651 B1 | * | 7/2001 | Kokubu et al. | 180/287 |
| 6,604,392 B1 | * | 8/2003 | Kiso et al. | 70/186 |
| 2002/0066295 A1 | * | 6/2002 | Jacobs et al. | 70/186 |
| 2004/0003632 A1 | * | 1/2004 | Ohtaki et al. | 70/252 |

FOREIGN PATENT DOCUMENTS

| | | | | |
|---|---|---|---|---|
| DE | 2261372 | * | 7/1974 | 70/252 |
| JP | 8443 | * | 1/1983 | 70/252 |
| JP | 0139846 | * | 8/1983 | 70/252 |
| JP | 0176850 | * | 9/1985 | 70/252 |
| JP | 0116956 | * | 5/1988 | 70/182 |
| JP | 0028054 | * | 1/1989 | 70/182 |
| JP | 0223282 | * | 9/1989 | 70/252 |

* cited by examiner

*Primary Examiner*—Lloyd A. Gall
(74) *Attorney, Agent, or Firm*—Akerman Senterfitt

(57) ABSTRACT

An engine starting apparatus including a lock body, a camshaft rotatably arranged in the lock body, and a knob connected to the camshaft. A lock pin restricts the rotation of the camshaft by engaging the camshaft. A solenoid moves the lock pin between a position in which the lock pin is engaged with the camshaft and a position in which the lock pin is disengaged from the camshaft. A tab is attached to the actuator and has a hole. The lock body has a cavity associated with the hole. A fastening pin is inserted in the hole and the cavity to fasten the solenoid to the lock body. This structure prevents the solenoid from being easily removed.

12 Claims, 4 Drawing Sheets

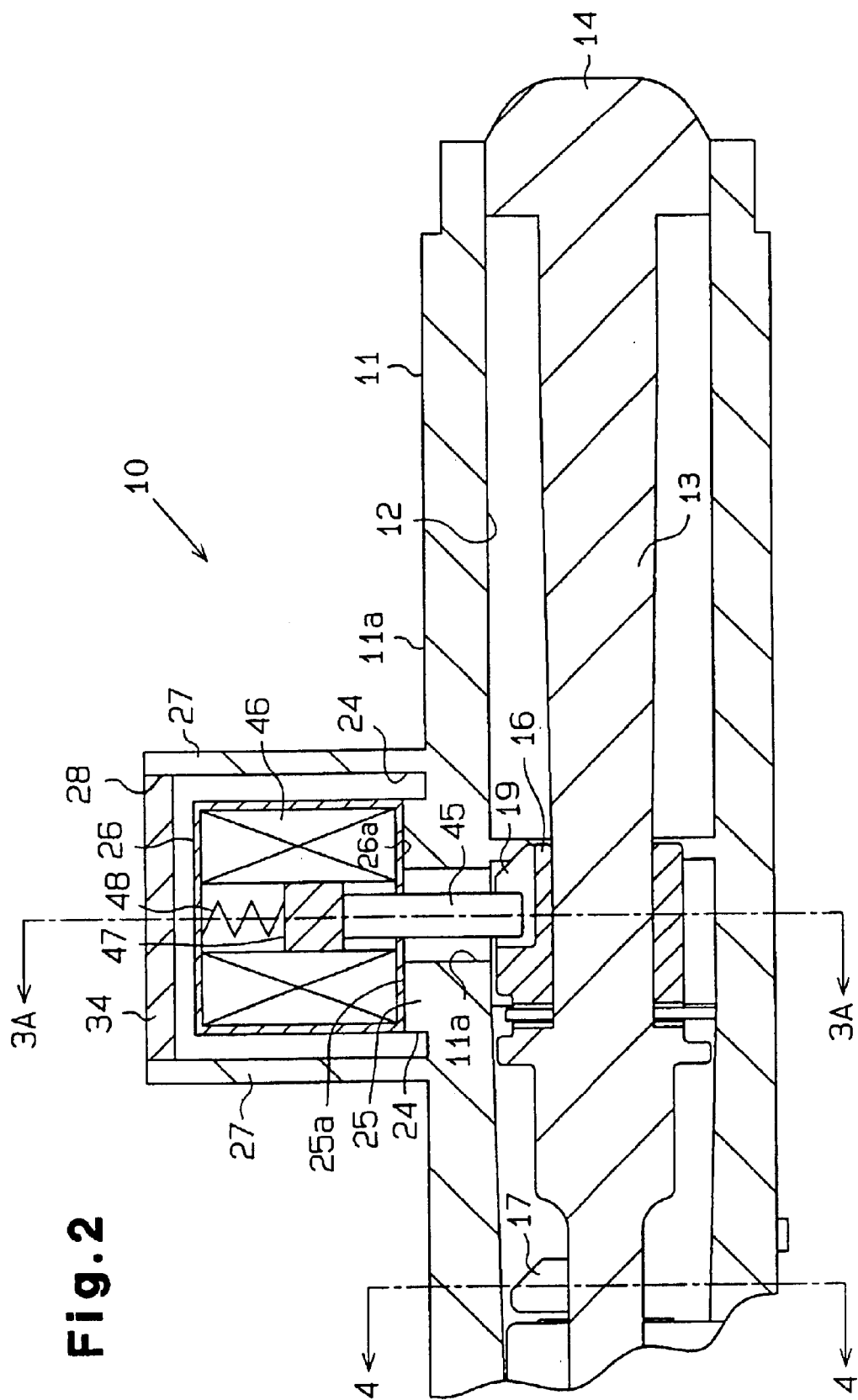

APPARATUS FOR STARTING VEHICLE ENGINE

BACKGROUND OF THE INVENTION

The present invention relates to an apparatus for starting a vehicle engine, and more particularly, to an improvement of an interlock mechanism for selectively restricting the rotation of an operating portion in an engine starting apparatus.

A smart ignition system (electronic key system) is known in the art as a type of vehicle engine starting apparatus.

An engine starting apparatus includes a rotatable operating portion and an ignition switch, which is moved between a LOCK position, an ACC (accessory) position, an ON position, and a START position in accordance with the rotation of the operating portion. The engine starting apparatus further includes an interlock mechanism for selectively restricting the rotation of the operating portion. The interlock mechanism includes a solenoid and a camshaft, which moves cooperatively with the operating portion. A lock pin extends from the solenoid to engage the camshaft and restrict the rotation of the operating portion.

The smart ignition system uses a portable device. When a driver holding the portable device enters the vehicle, an ID code of the portable device is compared with the ID code of a communication controller, which is installed in the vehicle. When the ID codes of the portable device and the communication controller match, the communication controller provides the solenoid with a control signal to disengage the lock pin from the camshaft. This enables the operating portion to be rotated from the LOCK position to the ACC position. When the operating portion is moved from the LOCK position to the ACC position, a steering shaft is disengaged from a steering wheel lock mechanism. This permits the steering wheel to be turned.

However, the solenoid is attached to the engine starting apparatus simply by screws. Thus, the solenoid may easily be removed from the engine starting apparatus by removing the screws with a screwdriver. The rotation of the operating portion cannot be restricted when the solenoid is removed from the engine starting apparatus. In this state, the operating portion can be moved from the LOCK position to the ACC position even without the portable device. This would enable the steering wheel to be turned. When the solenoid is removed from the engine starting apparatus in the above manner, a person that does not have the portable device may drive the vehicle. The same problem occurs in an engine starting apparatus that employs an ignition key (mechanical key) to start the engine.

SUMMARY OF THE INVENTION

It is an object of the present invention to provide a vehicle engine starting apparatus that prevents a solenoid from being easily removed from the starting apparatus.

To achieve the above object, the present invention provides an engine starting apparatus including a main body and a rotating member that is rotatably arranged in the main body. An operating member is connected to the rotating member. A lock member restricts the rotation of the rotating member by engaging the rotating member. An actuator moves the lock member between a position in which the lock member is engaged with the rotating member and a position in which the lock member is disengaged from the rotating member. An attaching member is attached to the actuator and has an attaching member hole. The main body has a cavity associated with the attaching member hole. A fastening member is inserted in the attaching member hole and the cavity to fasten the actuator to the main body.

A further perspective of the present invention is an engine starting apparatus including a main body and a rotating member that is rotatably arranged in the main body. An operating member is connected to the rotating member. A lock member restricts the rotation of the rotating member by engaging the rotating member. An actuator moves the lock member between a position in which the lock member is engaged with the rotating member and a position in which the lock member is disengaged from the rotating member. A cover case covers the actuator and has an opening and a cover case hole located near the opening. The main body has a cavity associated with the cover case hole. A fastening member is inserted in the cover case hole and the cavity to fasten the actuator to the main body.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which;

FIG. 2 is a schematic cross-sectional view showing the vehicle engine starting apparatus of FIG. 1;

DETAILED DESCRIPTION OF THE PREFERRED EMBODIMENTS

Figure 1:
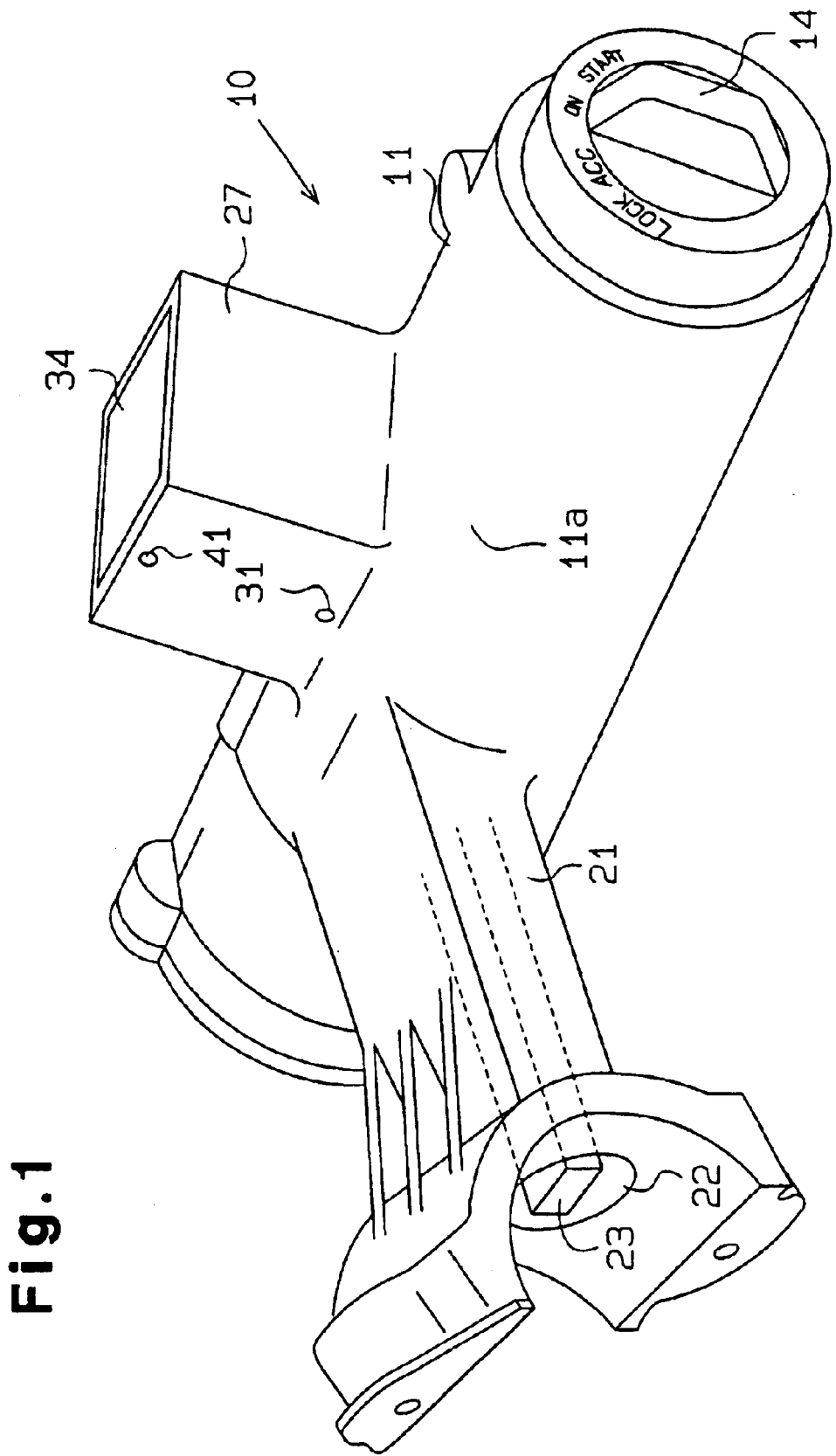
FIG. 1 is a schematic perspective view showing a vehicle engine starting apparatus according to a first embodiment of the present invention.

In the drawings, like numerals are used for like elements throughout.

A vehicle engine starting apparatus 10 according to a first embodiment of the present invention will now be discussed with reference to FIGS. 1 to 4. The starting apparatus 10 is provided with a smart ignition function.

As shown in FIGS. 1 and 2, the starting apparatus 10 includes a generally cylindrical lock body 11, which serves as a main body. A retaining bore 12 extends longitudinally through the lock body 11. A camshaft 13, which serves as a rotating member, is retained in the retaining bore 12 in a manner that the camshaft 13 is rotatable about its axis. A knob 14, which serves as an operating member and projects from an opened end of the retaining bore 12, is formed integrally with one end of the camshaft 13. When a driver turns the knob 14, the knob 14 and camshaft 13 are rotated to a LOCK position, an ACC position, an ON position, or a START position.

Figure 3A:
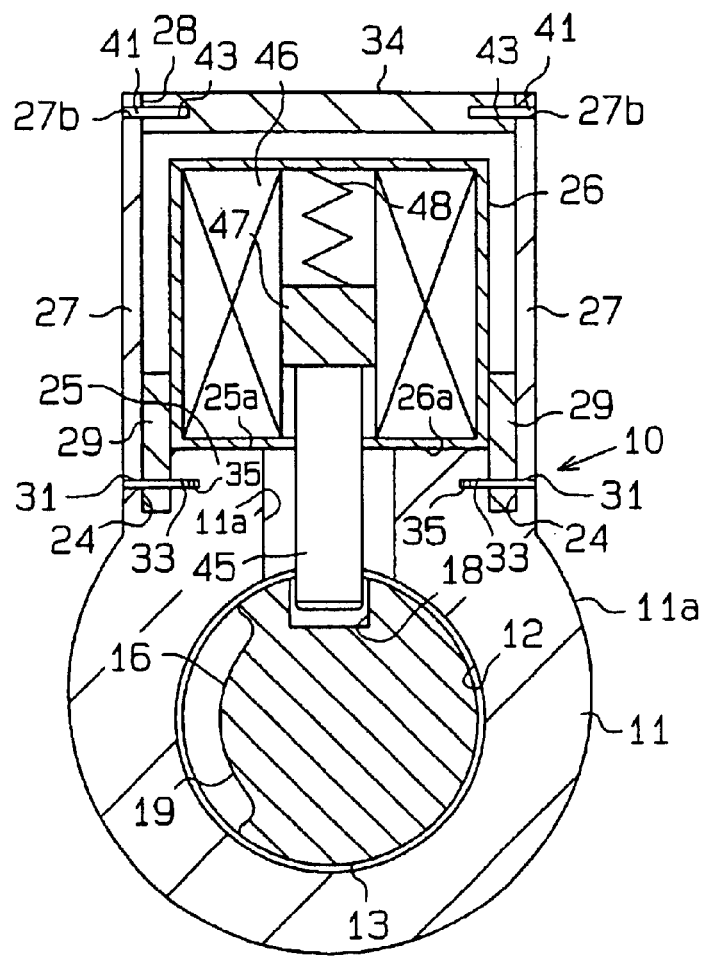
FIG. 3(a) is a schematic cross-sectional view of the vehicle engine starting apparatus of FIG. 2 taken along line 3A—3A.

Referring to FIG. 2, a first cam 16 and a second cam 17 are provided on the camshaft 13. As shown in FIG. 3(a), the first cam 16 has a first recess 18 and a second recess 19, which are formed in the outer surface of the first cam 16. The second recess 19 is wider than the first recess 18.

Figure 4:
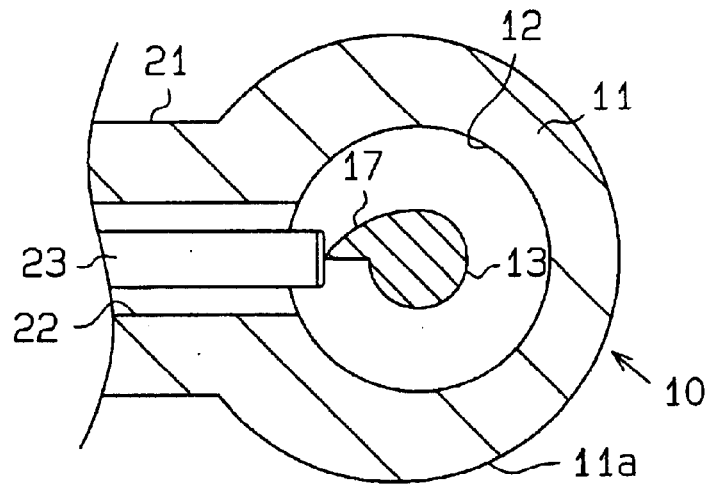
FIG. 4 is a schematic cross-sectional view of the vehicle engine starting apparatus of FIG. 2 taken along line 4—4.

Referring to FIG. 1, the lock body 11 has a peripheral surface 11a. An arm 21 extends integrally from and perpendicular to the peripheral surface 11a of the lock body 11. The lock body 11 is attached to a steering column (not shown). An insertion bore 22, which is connected to the retaining bore 12 of the lock body 11, extends through the arm 21. A lock bar 23 is inserted in the insertion bore 22. A spring (not shown) applies force to the lock bar 23 so that the lock bar 23 engages the second cam 17. As shown in FIG. 4, when the second cam 17 is rotated with the camshaft 13 arranged at the LOCK position, the lock bar 23 projects from the arm 21 into the steering column against the force of the spring to engage a steering shaft (not shown). When the camshaft 13 is arranged at the ACC position, the ON position, or the START position, the lock bar 23 remains in the arm 21.

Referring to FIG. 2, a seat 25 having a flat seat surface 25a is formed on the peripheral surface 11a of the lock body 11. A generally cubic solenoid 26, which serves as an actuator, is arranged on the seat surface 25a. The solenoid 26 has a flat contacting surface 26a, which faces the seat surface 25a.

Walls 27 surrounding the solenoid 26 is formed integrally with the lock body 11 around the seat 25 on the peripheral surface 11a of the lock body 11. A square opening 28 is defined between the distal ends of the walls 27. The walls 27 are taller than the solenoid 26. Grooves 24 extend between the seat 25 and the walls 27.

A pair of tabs (attaching members) 29 are fixed to opposing side surfaces of the solenoid 26 such that they overhang from the solenoid 26, as shown in FIG. 3(a). The solenoid 26 is arranged on the seat surface 25a so that the two tabs 29 are inserted in two of the grooves 24. The thickness of each tab 29 is less than the width of the groove 24.

Figure 3B:
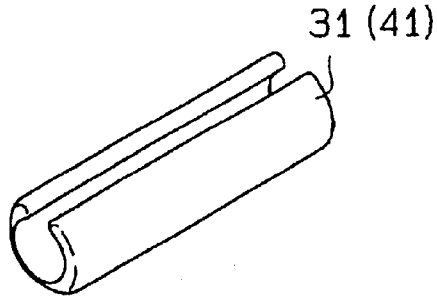
FIG. 3(b) is a schematic perspective view of a fastening pin of the vehicle engine starting apparatus of FIG. 3(a)
Figure 3C:
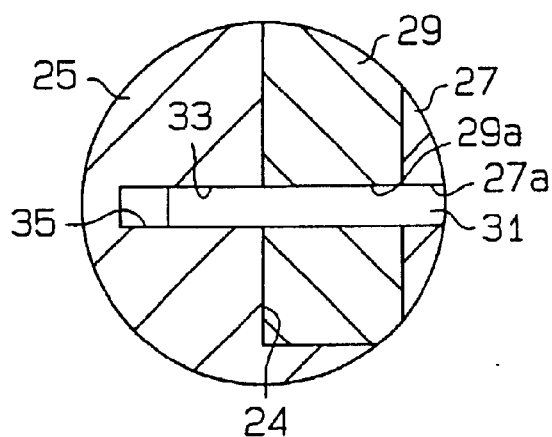
FIG. 3(c) is a partial cross-sectional view showing an engaging portion of the fastening pin of FIG. 3(b)

As shown in FIG. 3(c), a first hole 29a (an attaching member hole) extends through the distal portion of each tab 29. In association with the first hole 29a, a second hole 27a (a wall hole) extends through the basal portion of the corresponding wall 27. In association with the second hole 27a, a cavity 33 is formed in the corresponding side surface of the seat 25. A fastening pin 31 is fitted in the aligned first hole 29a, second hole 27a, and cavity 33 to fasten the solenoid 26 to the seat 25 of the lock body 11. The fastening pin 31, which serves as a fastening member, is longer than the cavity 33. Further, the fastening pin 31 is located at a position lower than the seat surface 25a of the seat 25 and in the vicinity of the peripheral surface 11a of the lock body 11. The distal end of the fastening pin 31 does not protrude from the surface of the wall 27.

As shown in FIG. 3(b), the fastening pin 31 is a spring pin having a C-like cross-section. The peripheral surface of the fastening pin 31 is not threaded. When the fastening pin 31 is fitted in the holes 29a, 27a and the cavity 33, a predetermined space 35 is defined in the cavity 33 between the fastening pin 31 and the end of the cavity 33.

The opening 28 between the walls 27 is closed by a cover plate 34, which serves as a cover member. A pair of third holes 27b extends through the distal ends of the opposing walls 27. A pair of cavities 43 is formed in opposing ends of the cover plate 34 in association with the third holes 27b. A fastening pin 41 is fitted in each third hole 27b and the associated cavity 43. The fastening pin 41 is a spring pin having a C-like cross-section. The fastening pin 41 is fitted in the cavity 43 until it reaches the inner end of the cavity 43. The solenoid 26 is encompassed by the cover plate 34 and the walls 27. In this state, a predetermined clearance is provided between the cover plate 34 and the solenoid 26.

The solenoid 26 includes a lock pin 45, a plunger 47, which is connected to the lock pin 45, a coil 46, which moves the plunger 47, and a spring 48, which biases the plunger 47. The de-excitation and excitation of the coil 46 moves the plunger 47 in the solenoid 26.

The lock body 11, which serves as a lock member, has a through bore 11b to receive the lock pin 45. The lock pin 45 projects out of the through bore 11b and into the retaining bore 12. When the coil 46 is not excited, the force of the spring 48 projects the lock pin 45 from the through bore 11b. This engages the lock pin 45 with the first recess 18 or second recess 19 of the first cam 16. When the coil 46 is excited, the lock pin 45 is retracted in the through bore 11b to disengage the lock pin 45 from the recess 18 or 19.

The lock pin 45 engages the first recess 18 when the camshaft 13 (knob 14) is arranged at the LOCK position and the lock bar 23 is engaged with the steering shaft. The lock pin 45 engages the second recess 19 when the camshaft (knob 14) is arranged at the ACC position, the ON position, or the START position and the lock bar 23 is disengaged from the steering shaft.

A communication controller (not shown) controls the coil 46 of the starting apparatus 10. The communication controller excites the coil 46 when an ID code included in a signal transmitted from a portable device (not shown) held by the driver matches an ID code stored in the communication controller, which is installed in the vehicle. The communication controller also excites the coil 46 when a shift lever of a shift lever apparatus is arranged at a parking position or a neutral position.

To remove the solenoid 26 from the lock body 11, at least the cover plate 34 must be removed from the walls 27. The cover plate 34 is fastened to the walls 27 by the fastening pins 41, which do not protrude from the surface of the walls 27. Thus, the fastening pins 41 cannot be removed from the walls 27 even with a screwdriver.

Further, the solenoid 26 is fastened to the seat 25 by the fastening pins 31, which do not protrude from the surface of the walls 27. Thus, the fastening pins 31 cannot be removed from the walls 27 even with a screwdriver. Accordingly, the solenoid 26 cannot easily be removed from the lock body 11 even if the cover plate 34 is broken.

Each cavity 33 in the seat 25 is formed so that a space 35 is provided between the distal end of the fastening pin 31 and the inner end of the cavity 33. Thus, for example, if each fastening pin 31 were to be pushed from the outer side, the fastening pin 31 would move toward the inner end of the associated cavity 33. Thus, the fastening pin 31 would not fall out of the wall 27. Further, once the fastening pin 31 is fitted into the associated cavity 33, the fastening pin 31 moves further into the cavity 33 when pushed. This makes it difficult to pull out the fastening pin 31.

The fastening pins 31 are located near the basal ends of the walls 27, that is, near the peripheral surface 11a of the lock body 11. Various devices, such as a steering column, are arranged around the starting apparatus 10 in the vehicle. Thus, for example, if someone tries to remove the fastening pins 31 with a tool, the peripheral surface 11a of the lock body 11 would get in the way and make it difficult to remove the fastening pins 31. Further, the bordering portions between the peripheral surface 11a of the lock body 11 and the walls 27 are curved. In comparison with a flat bordering portion, the curved bordering portions of the peripheral surface 11a make it more difficult to remove the fastening pins 31.

The walls 27 are formed integrally with the lock body 11. Further, the walls 27 are taller than the solenoid 26. Thus, even if the cover plate 34 were broken, the solenoid 26 would not easily be removed from the seat 25 unless the walls 27 were broken.

The vehicle engine starting apparatus 10 of the first embodiment has the advantages described below.

(1) The solenoid 26 is fastened to the seat 25 with the tabs 29, which are fixed to the solenoid 26, by fitting the fastening pins 31 into the cavities 33 of the seat 25, the first holes 29a of the tabs 29, and the second holes 27a of the walls 27. Further, the fastening pins 31 do not protrude from the surfaces of the walls 27. Since the fastening pins 31 cannot be removed by a screwdriver, the removal of the solenoid 26 from the lock body 11 is difficult. This increases security.

(2) The walls 27 surround the solenoid 26 and are taller than the solenoid 26. Thus, unless the cover plate 34 is removed and the walls 27 are broken, the solenoid 26 cannot be removed from the lock body 11. This further increases security.

(3) The cover plate 34 is fixed to the walls 27 in the opening 28 by the fastening pins 41. Thus, the solenoid 26 is covered by the walls 27 and the cover plate 34. Further, the solenoid 26 is not visual. In addition, the fastening pins 41 cannot be removed from the walls 27 with a screwdriver. This makes it difficult to remove the cover plate 34.

(4) When each fastening pin 31 is pushed from the outer side, the fastening pin 31 moves into the space 35 further toward the inner end of the cavity 33. This makes it further difficult to remove the fastening pins 31.

(5) The fastening pins 31 are located near the basal ends of the walls 27, that is, near the peripheral surface 11a of the lock body 11. Thus, when someone tries to remove the fastening pins 31, the peripheral surface 11a of the lock body 11 would get in the way and make it difficult to remove the fastening pins 31.

(6) The tabs 29, which are fixed to the solenoid 26, facilitate the arrangement of the fastening pins 31 near the peripheral surface 11a of the lock body 11.

Figure 5:
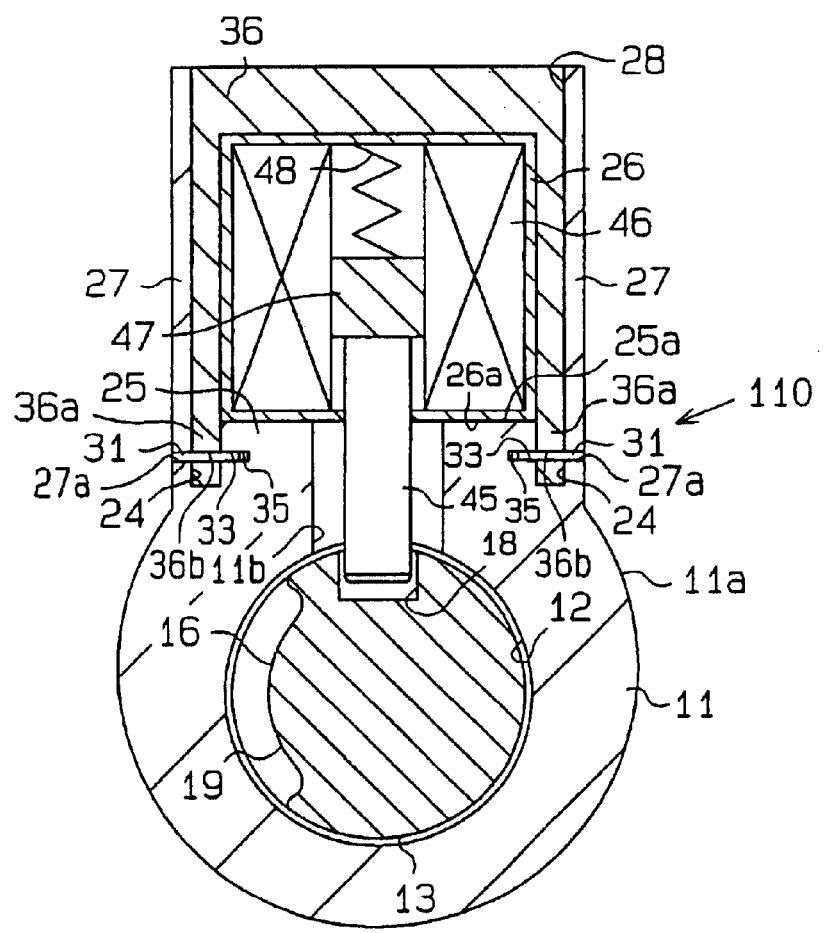
FIG. 5 is a schematic cross-sectional view showing a vehicle engine starting apparatus according to a second embodiment of the present invention.

FIG. 5 shows a vehicle engine starting apparatus 110 according to a second embodiment of the present invention. The starting apparatus 110 includes a cover case 36, which covers the solenoid 26.

The cover case 36 is box-like and has an opening, or opened end 36a, which is engaged with the grooves 24 between the seat 25 and the walls 27. The inner surfaces of the cover case 36 are in contact with the solenoid 26.

Holes 36b extend through the opened end 36a of the cover case 36. The fastening pins 31 are inserted through the holes 27a of the walls 27 and the holes 36b and fitted in the cavities 33 of the seat 25. This fastens the cover case 36 to the lock body 11. In this state, the inner surfaces of the cover case 36 are in contact with the solenoid 26. Thus, the solenoid 26 is held between the cover case 36 and the seat 25. As a result, the solenoid 26 is fixed to the lock body 11. In other words, the cover case 36, which is fastened to the lock body 11 by the fastening pins 31, secures the solenoid 26 to the lock body 11.

To remove the solenoid 26 from the lock body 11, the cover case 36 must first be taken off. However, the cover case 36 is fastened to the basal portion of the walls 27 by the fastening pins 31. Further, the fastening pins 31 do not protrude from the surface of the associated walls 27. Thus, the removal of the fastening pins 31 from the cavities 33 is extremely difficult, and the removal of the solenoid 26 from the lock body 11 is difficult.

The vehicle engine starting apparatus 110 of the second embodiment has the advantages described below.

(1) The cover case 36, which covers the solenoid 26, is fastened to the basal portion of the seat 25 by the fastening pins 31. Accordingly, the solenoid 26 is fixed to the seat 25 by the cover case 36. The fastening pins 31 cannot be removed by a screwdriver. Thus, the cover case 36 cannot be removed from the lock body 11, and the solenoid 26 cannot be removed from the lock body 11. This improves security.

(2) The cover case 36 covers the solenoid 26. Thus, the solenoid 26 is not visual from the outer side of the cover case 36.

(3) Only the two fastening pins 31 are required to fix the solenoid 26 to the lock body 11. This reduces costs in comparison with the first embodiment since the fastening pins 41 are not necessary.

(4) The fastening pins 31 are arranged near the peripheral surface 11a of the lock body 11. This makes it further difficult to remove the solenoid 26 from the starting apparatus 110.

It should be apparent to those skilled in the art that the present invention may be embodied in many other specific forms without departing from the spirit or scope of the invention. Particularly, it should be understood that the present invention may be embodied in the following forms.

(a) The tabs 29 may be fixed to all four side surfaces of the solenoid 26. Alternatively, the two tabs 29 may be fixed to the contacting surface 26a. In such case, each tab 29 is bent in an L-like manner and inserted in the associated groove 24. Further, the tabs 29 may be formed integrally with the solenoid 26.

(b) The number of the fastening pins 31 used to fasten the solenoid 26 to the lock body 11 is not limited to two. Three or more fastening pins 31 may be used.

(c) The present invention may be applied to a vehicle engine starting apparatus that employs a mechanical key. In this case, the coil 46 of the solenoid 26 is excited when the shift lever of the shift lever apparatus is arranged at the parking position or the neutral position.

(d) The present invention may be applied to a vehicle engine starting apparatus that is not provided with a steering lock function. In this case, a steering lock device, which includes a cam and a lock bar, may be arranged separately from the vehicle engine starting apparatus 10 in the vehicle. When the camshaft 13 (knob 14) is rotated from the LOCK position to another position, such as the ACC position, an electric signal is provided to the steering lock apparatus to disengage the lock bar from the steering shaft.

(e) In the second embodiment, the walls 27 may be eliminated.

(f) In the first embodiment, the cover plate 34 may be eliminated. In this case, as long as the walls 27 are taller than the solenoid 26, the solenoid 26 cannot be removed unless the walls 27 are broken. Thus, the same level of security may be maintained even if the cover plate 34 is removed.

(g) The seat 25 of the lock body 11 may be eliminated. In this case, the cavities 33 would be formed in the peripheral surface 11a of the lock body 11.

(h) In the first and second embodiments, the cavities 33 do not have to be provided in the seat 25. For example, the cavities 33 may be formed in the basal portion of the cover case 36 in the second embodiment to fix the solenoid 26 to the lock body 11 with the fastening pins 31. The cavities 33 may also be formed in the cover plate 34 to fix the solenoid 26 to the lock body 11 with the fastening pins 31. In this case, the tabs 29 may be arranged between the cover plate 34 and the walls 27.

(i) In the first and second embodiments, the space 35 does not have to be provided in each cavity 33. Further, a through hole may be used in lieu of the cavity 33. Additionally, the space 35 may be provided in each cavity 43 of the cover plate 34.

(j) The fastening pins do not have to be spring keys and may be, for example, taper pins or parallel pins.

(k) A projection may be provided on the peripheral surface 11a of the lock body 11 so that the projection interferes with someone who tries the remove the solenoid 26.

The present examples and embodiments are to be considered as illustrative and not restrictive, and the invention is not to be limited to the details given herein, but may be modified within the scope and equivalence of the appended claims.

What is claimed is:

1. An engine starting apparatus comprising:

a main body;

a rotating member that is rotatably arranged in the main body;

an operating member connected to the rotating member;

a lock member for restricting the rotation of the rotating member by engaging the rotating member;

an actuator for moving the lock member between a position in which the lock member is engaged with the rotating member and a position in which the lock member is disengaged from the rotating member;

an attaching member attached to the actuator and having an attaching member hole, wherein the main body has a cavity associated with the attaching member hole, and wherein the actuator has a contacting surface, and wherein the main body has a seat for receiving the contacting surface of the actuator, the cavity being formed in the seat;

a wall that extends from the main body around the seat, wherein the wall has a wall hole associated with the attaching member hole and the cavity of the main body; and a fastening member in the wall hole, the attaching member hole, and the cavity to fasten the actuator to the main body.

2. The apparatus according to claim 1, wherein the fastening member is a fastening pin that is fitted in the attaching member hole and the cavity.

3. The apparatus according to claim 2, wherein the fastening pin is completely fitted in the attaching member hole and the cavity.

4. The apparatus according to claim 2, wherein an inner end of the cavity and the fastening pin are separated to define a space in between the inner end and the fastening pin.

5. The apparatus according to claim 1, further comprising a groove formed between the wall and the seat to receive the attaching member.

6. The apparatus according to claim 1, wherein the wall is taller than the actuator.

7. The apparatus according to claim 5, wherein the wall has an opening, the apparatus further comprising:

a cover member for covering the opening.

8. An engine starting apparatus comprising:

a main body;

a rotating member that is rotatably arranged in the main body;

an operating member connected to the rotating member;

a lock member for restricting the rotation of the rotating member by engaging the rotating member;

actuator for moving the lock member between a position in which the lock member is engaged with the rotating member and a position in which the lock member is disengaged from the rotating member, wherein the actuator has a contacting surface, and the main body has a seat for receiving the contacting surface of the actuator;

a cover case covering the actuator and having an opening and a cover case hole located near the opening, wherein the main body has a cavity associated with the cover case hole;

a wall that extends from the main body around the seat and contacts the cover case, wherein the wall has a wall hole associated with the cover case hole; and a fastening member inserted in the wall hole, the cover case hole, and the cavity to fasten the actuator to the main body.

9. The apparatus according to claim 8, wherein the fastening member is a fastening pin that is fitted in the cover case hole and the cavity.

10. The apparatus according to claim 9, wherein the fastening pin is completely fitted in the cover case hole and the cavity.

11. The apparatus according to claim 9, wherein an inner end of the cavity and the fastening pin are separated to define a space in between the inner end and the fastening pin.

12. The apparatus according to claim 8, further comprising a groove formed between the wall and the seat to receive the opening of the cover case.

* * * * *